United States Patent
Vedantham et al.

(10) Patent No.: US 8,478,342 B2
(45) Date of Patent: Jul. 2, 2013

(54) INTER-CELL INTERFERENCE COORDINATION

(75) Inventors: Ramanuja Vedantham, Allen, TX (US); Sandeep Bhadra, Addison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 218 days.

(21) Appl. No.: 12/948,281

(22) Filed: Nov. 17, 2010

(65) Prior Publication Data

US 2011/0117967 A1    May 19, 2011

Related U.S. Application Data

(60) Provisional application No. 61/262,652, filed on Nov. 19, 2009.

(51) Int. Cl.
*H04B 1/38* (2006.01)
(52) U.S. Cl.
USPC ...... 455/561; 455/509; 455/452.1; 455/456.5
(58) Field of Classification Search
USPC ................ 455/509, 561, 452.1; 370/329
See application file for complete search history.

(56) References Cited

U.S. PATENT DOCUMENTS

2009/0268684 A1* 10/2009 Lott et al. ............... 370/329
2010/0267408 A1* 10/2010 Lee et al. ............... 455/509

OTHER PUBLICATIONS

3rd Generation Partnership Project; Technical Specification Group Radio Access Network; Evolved Universal Terrestrial Radio Access Network (EUTRAN); X2 application protocol (X2AP); (Release 8); 3GPP TS 36.423, V8.2.0 (Jun. 2008), 78 pages.
Bhadra, Sandeep et al., OFDMA Interference Management Study: Preliminary Results with Mixed Traffic and SPS-only traffic for Femto/Femto UL Interference, Femto Forum Working Group 2 Document, Texas Instruments Inc., Nov. 2009, 9 pages.

* cited by examiner

*Primary Examiner* — David Q Nguyen
(74) *Attorney, Agent, or Firm* — Steven A. Shaw; W. James Brady; Frederick J. Telecky, Jr.

(57) ABSTRACT

A system and method for coordinating interference in cellular systems are disclosed herein. In one embodiment, a cellular base station interference coordinator includes an interference estimator. The interference estimator estimates a level of interference caused by transmissions controlled by a host base station for each of a plurality of radio resources, and provides interference estimates corresponding to the radio resources to a target base station. Each interference estimate is based on transmit power and channel strength to the target base station for each transmission controlled by the host base station for a radio resource.

21 Claims, 7 Drawing Sheets

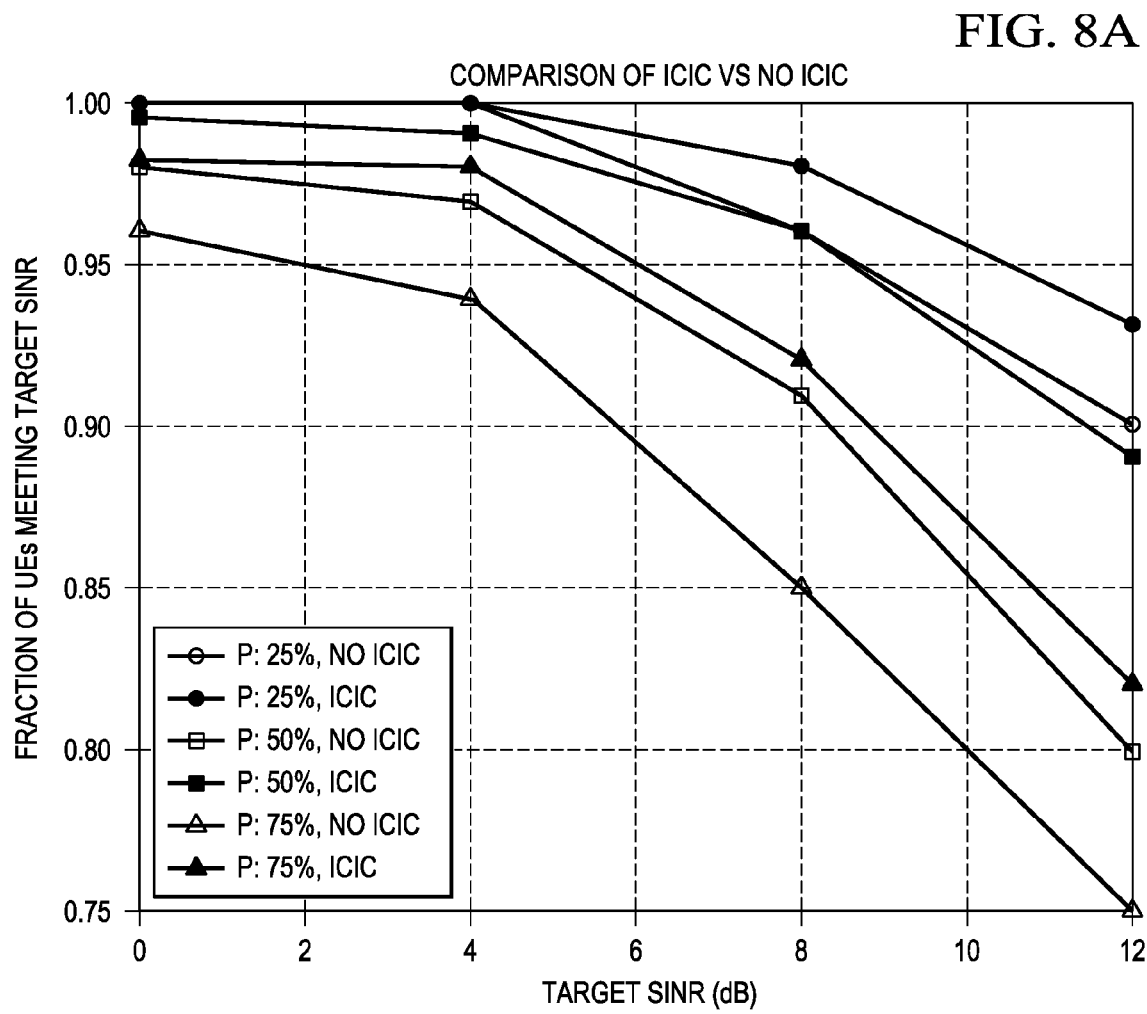

INTER-CELL INTERFERENCE COORDINATION

CROSS-REFERENCE TO RELATED APPLICATION

The present application claims priority to U.S. Provisional Patent Application No. 61/262,652, filed on Nov. 19, 2009 entitled "Method for Efficient Inter-Cell Interference Coordination for Cellular Networks" which is hereby incorporated herein by reference in its entirety.

BACKGROUND

As cellular communication networks evolve, smaller sized cells, e.g., picocells and/or femtocells ("femtocells"), are being introduced to enhance service in areas where the cellular network is overloaded or network coverage is weaker than desired, inside a home or office for example. Any number of femtocells may coexist in the same channels, and will often overlap with macro-cells. Consequently, the addition of femtocells is likely to cause cellular systems to become more interference limited than noise limited. For this reason, interference management and coordination is an important consideration when deploying femtocells.

SUMMARY

A system and method for coordinating interference in cellular systems are disclosed herein. In one embodiment, a cellular base station interference coordinator includes an interference estimator. The interference estimator estimates a level of interference caused by transmissions controlled by a host base station for each of a plurality of radio resources (allocations of time and/or frequency), and provides interference estimates corresponding to the radio resources to a target base station. Each interference estimate corresponds to a radio resource and is based on transmit power and channel strength to the target base station for each transmission controlled by the host base station for the radio resource.

In another embodiment, a method for coordinating inter-cell interference includes combining, in a first base station, a transmit power and a channel strength to a target base station for each transmission over a radio resource. An interference estimate for the radio resource is generated based on the combined power and strength. The interference estimate is provided to the target base station.

In yet another embodiment, a system includes a first cellular base station and a second cellular base station. The first cellular base station includes interference estimation logic and the second cellular base station includes interference avoidance logic. The second cellular base station is coupled to the first cellular base station for communication therewith. The interference estimation logic is configured to estimate a level of interference caused by transmissions controlled by the first cellular base station for each of a plurality of radio resources, and to provide interference estimates to the second base station for each radio resource. Each interference estimate is based on a combination of transmit power and channel strength to the second cellular base station for each transmission.

In a further embodiment, a cellular base station interference coordinator includes an interference avoider. The interference avoider assigns radio resources to each transmission controlled by a host base station based on interference estimates received from a neighboring base station. The interference avoider is configured to accumulate interference estimates for each radio resource and to categorize the radio resources based on the accumulated interference estimates.

BRIEF DESCRIPTION OF THE DRAWINGS

For a detailed description of exemplary embodiments of the invention, reference will now be made to the accompanying drawings in which:

FIGS. 8A and 8B show graphs illustrating performance of a cellular system employing ICIC in accordance with various embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the present disclosure employ an inter-cell interference coordination ("ICIC") mechanism to mitigate interference between neighboring cells. ICIC, as disclosed herein, ensures that a base station (e.g., a Home evolved NodeB, ("HeNB")) avoids scheduling user equipment ("UE") transactions at times and/or on frequencies where a high level of interference from neighboring cells is expected. ICIC complements interference reduction by ensuring that a base station avoids scheduling a wireless device to use radio resources experiencing high interference from neighboring cells.

Figure 1:
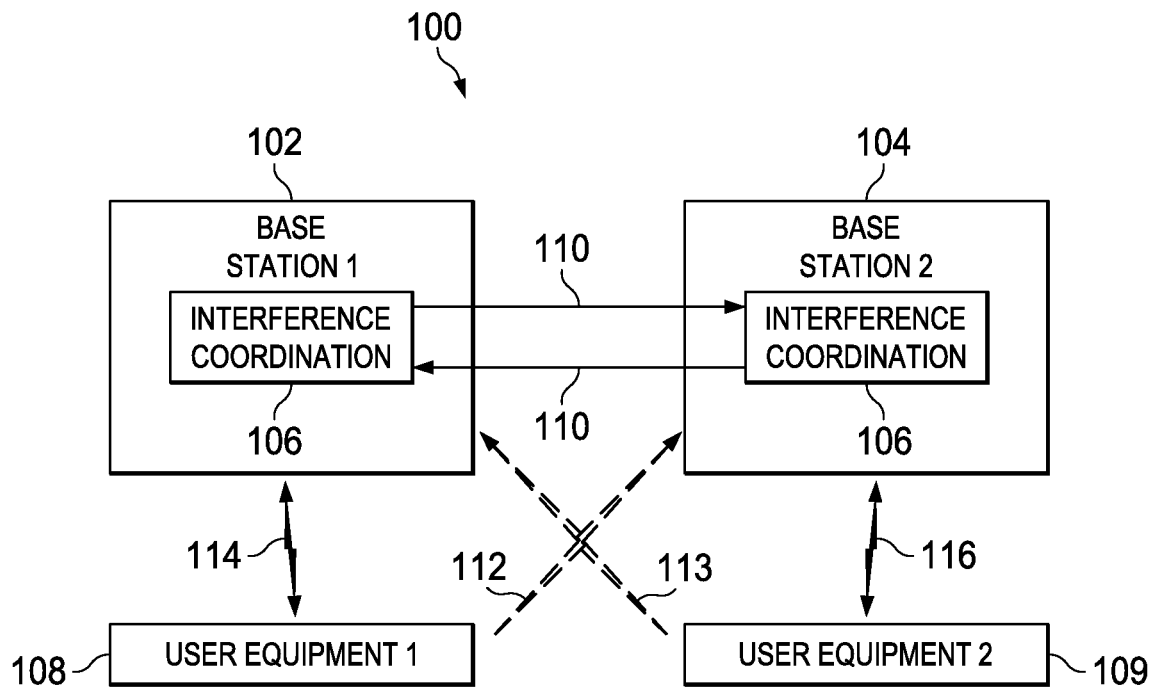
FIG. 1 shows a block diagram of a cellular system including inter-cell interference coordination ("ICIC") in accordance with various embodiments.

FIG. 1 shows a block diagram of an exemplary cellular system 100 including ICIC in accordance with various embodiments. The system 100 includes base stations 102 and 104, each of which provides communication to/from wireless devices in an area surrounding the base station (i.e., a cell). User equipment ("UE1") 108 is disposed to wirelessly communicate with the base station 1 102, and UE2 109 is disposed to wirelessly communicate with the base station 2 104. Though only base stations 102 and 104 are shown, in practice the system 100 may include any number of base stations in close proximity to one another as would occur, for example, when employing femtocells in dense residential housing. Similarly, though only UEs 108 and 109 are shown, in practice any number of wireless devices may disposed to communication with either of base stations 102 and 104. The UEs 108 and 109 may be any wireless device configured to communicate with a base station 102, 104. For example, the UE 108 may be a cellular handset, a tablet computer, a notebook computer, desktop computer, a personal digital assistance, a personal music player, etc.

Communication 114 between the base station 1 102 and the UE 108 uses radio resources allocated by the base station 102 for such communication. Radio resources are frequency bands and/or time intervals over which data is transmitted between a base station and a UE. Because the set of radio resources available to the base station 1 102 may be the same as the set of radio resources available to the base station 2 104, transmissions 114 between the base station 1 102 and UE1 108 may be detectable by base station 2 104 and/or UE 2 109 as signals 112, and thus may interfere with transmissions 116 between the base station 2 104 and the UE2 109. Similarly, transmissions 116 may be detectable as signals 113 and therefore interfere with transmissions 114 when overlapping sets of radio resources are allocated to transmissions 114 and 116.

Embodiments of the system 100 mitigate such inter-cell interference by coordinating the assignment of radio resources based on interference level estimates 110 exchanged between the base stations 102, 104. Each of base stations 102, 104 includes interference coordination logic 106 that estimates a level of interference for each radio resource attributable to transmissions (e.g., transmissions 114) controlled by the estimating base station (e.g., base station 1 102) with respect to a neighboring base station (e.g., base station 2 104). A base station (e.g., base station 2 104) receiving the interference level estimates 110 can thereafter allocate radio resources to the transmission 116 in a way that minimizes interference to the transmission 116 from transmissions controlled by base station 1 102.

Some embodiments of the system 100 may be based on the Long Term Evolution ("LTE") standard promulgated by the 3rd Generation Partnership Project ("3GPP"). Accordingly, each of the base stations 102, 104 may be an evolved NodeB ("eNB"), a home eNB ("HeNB"), etc. Radio resources may correspond to physical resource blocks ("PRBs") that define slot and sub-carrier allocation for LTE. The base stations 102, 104 may exchange interference level estimates via the X2 interface using inter-base station communication as is known in the art. ICIC messaging in some embodiments may be at a semi-static time scale, in comparison to packet transmission intervals, to account for delays induced by the X2 interface. Accordingly, some embodiments are directed to scheduling of semi-persistent-scheduled ("SPS") calls in the eNB.

Figure 2:
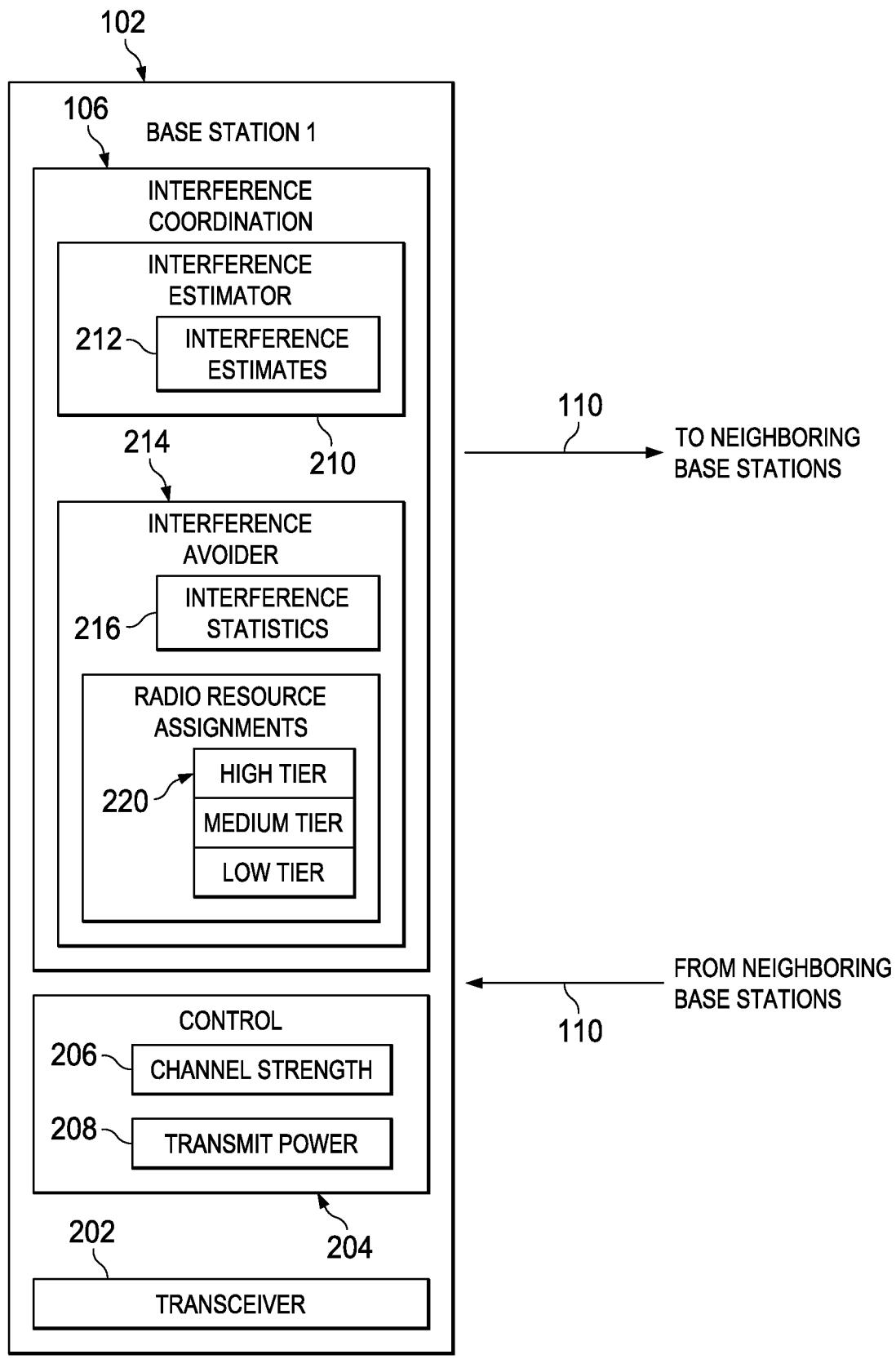
FIG. 2 shows a block diagram of a base station implementing ICIC in accordance with various embodiments.

FIG. 2 shows a block diagram of the base station 1 102 (also applicable to the base station 2 104) in accordance with various embodiments. The base station 1 102 includes a transceiver 202, control logic 204 and interference coordination logic 106. The transceiver 202 interfaces the base station 1 102 to transmission media via one or more antennas (not shown) for wireless communication. The control logic 204 manages radio transmission characteristics such as transmit power, radio resource allocation, channel evaluation, modulation, etc.

The interference coordination logic 106 is configured to estimate base station 1 102 induced interference with neighboring base stations, and to avoid interference from neighboring base stations based on interference estimates received from the neighboring base stations. The interference coordination logic 106 includes an interference estimator 210 and an interference avoider 214. The interference estimator 210 computes interference estimates 212 and provides the interference estimates 212 to neighboring base stations. The interference estimator 210 produces an interference level estimate for each radio resource with respect to each neighboring base station. Each interference level estimate considers the contribution of each device controlled by the base station 1 102 to interference with a neighboring base station.

In some embodiments of the interference estimator 210, for each neighboring base station and each radio resource, the estimator 210 determines the transmission power applied by each wireless device controlled by the base station 1 102 to the radio resource, estimates the channel strength between the each such wireless device and a given neighboring base station, and computes a sum of products of the transmission power and channel strength for all such wireless devices. The sum of products may be compared to a threshold value to generate a "high" interference flag value for transmission to the given neighboring base station. In some embodiments, the sum of products itself or a value derived from the sum of products may be provided to the neighboring base station. In some embodiments, the threshold value may be at or close to the maximum transmit power for a wireless device controlled by the base station 1 102.

The interference estimator 210 may retrieve the transmit power values 208 and channel strength values 206 from the control logic 204. Alternatively, the interference estimator 210 may retrieve power 208 and strength 210 values and/or values from which the power 208 and strength 210 values can be derived from another location in the base station 1 102. For example, the interference estimator 210 may estimate channel strength between the UE 1 108 and base station 2 104 based on measurements of UE 1 108 signal strength at the base station 1 102 and the estimated locations of the UE 1 108 and base station 2 104 relative to the base station 1 102. In an embodiment wherein the base station 1 102 is an eNB, the channel strength values may be estimated using reference signal received power ("RSRP") and/or reference signal received quality ("RSRQ") measurements retrieved from the radio resource control ("RRC"). In an LTE embodiment, the "high" interference flag values may be transferred to the neighboring eNB via the X2 interface using high interference indicator ("HII") signaling provided by LTE.

The interference avoider 214 receives interference estimate values provided by neighboring base stations and assigns radio resources to wireless devices controlled by the base station 1 102 based on the received interference estimates. The interference avoider 214 compiles interference statistics 216 for each radio resource. For example, the interference avoider 214 may maintain a set (e.g., a history) of interference levels for each radio resources that tracks the received interference estimates over time. Based on the set of interference levels, the interference avoider 214, in conjunction with the control logic in some embodiments, avoids assigning to future transmissions radio resources that may be subject to high levels of interference from neighboring base stations.

Some embodiments of the interference avoider 214, establish interference threshold values by identifying a maximum and minimum interference level across the radio resources. For example, the lowest number of high interference estimates received from neighboring base stations for a radio resource may be eleven and the lowest number of high interference estimates received for a different radio resource may be forty. Based on these minimum and maximum threshold values, the interference avoider 214 may define a plurality of interference tiers 220. Based on the foregoing example, the interference avoider may establish a low interference tier encompassing radio resources with between 11 and 20 high interference estimates, a medium interference tier encompassing radio resources with between 21 and 30 high interference estimates, and a high interference tier encompassing radio resources with between 31 and 40 high interference estimates. Different embodiments implement different numbers of tiers. The interference avoider 214 assigns transmissions to the low interference tier radio resources before assigning transmissions to available medium interference tier radio resources, and assigns transmissions to the medium interference tier radio resources before assigning transmissions to available high interference tier radio resources. The interference avoider 214 reassigns transmissions previously assigned to higher interference radio resources to lower interference radio resources when available. For example, a transmission assigned to high interference tier radio resources can be reassigned to radio resources of a lower interference tier to mitigate interference with the transmission.

Various components of the base station 1 102, including at least some portions of the interference estimator 210 and the interference avoider 214, can be implemented using a processor and software programming that causes the processor to perform the operations described herein. In particular, software programming can be used to cause a processor to generate the interference estimates 212 provided to neighboring base stations, and to assign radio resources based on interference estimates received from neighboring base stations. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming executable by a processor can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement the interference coordination logic 106 described herein using dedicated circuitry. Some embodiments may use a combination of dedicated circuitry and software executed by a processor. Selection of a hardware or software/processor implementation of embodiments is a design choice based on a variety of factors, such as cost and the ability to incorporate changed or additional functionality in the future.

Figure 3:
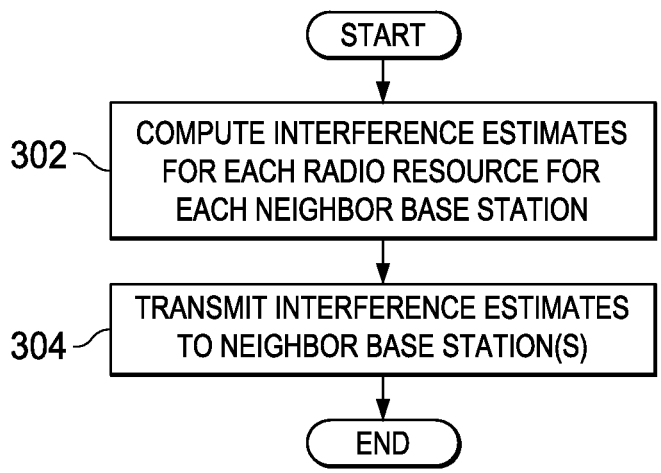
FIG. 3 shows a flow diagram for a method for estimating interference levels related to a cellular base station in accordance with various embodiments.

FIG. 3 shows a flow diagram for a method for estimating interference levels related to a cellular base station in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by a processor.

In block 302, the base station 1 102 is operating and wirelessly communicating with one or more wireless device in a cell. The interference estimator 210 computes interference estimates 212 for each radio resource, considering each wireless device controlled by the base station 1 102, for each base station neighboring the base station 1 102. Computing of the interference estimates may be triggered based on time (e.g., expiration of timer) or occurrence of an event in the base station 1 102 indicating that the interference estimates should be provided to neighboring base stations.

In block 304, the interference estimator 210 transmits interference estimates to one or more neighboring base stations. Each neighboring base station may receive a message including only the interference estimates computed with reference to that base station. In some embodiments, the interference estimates are transmitted only to the closest neighbor base station assuming that the closest neighbor will experience the highest level of interference. In other embodiments, the interference estimates are provided to more than one, or to all, neighboring base stations.

Figure 4:
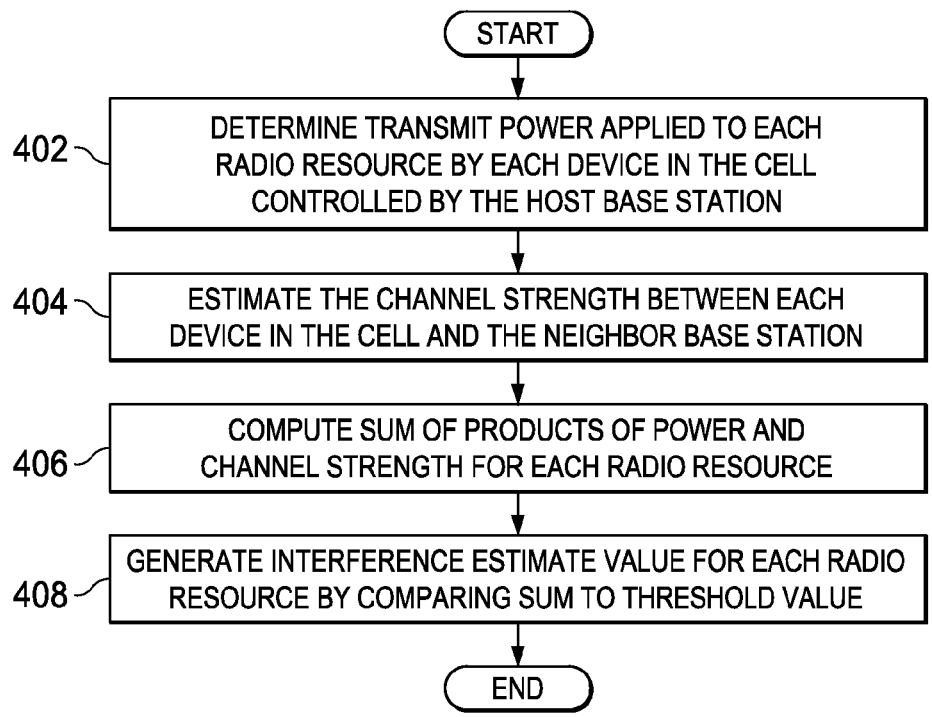
FIG. 4 shows a flow diagram for a method for estimating interference levels related to a cellular base station with respect to a neighboring base station in accordance with various embodiments.

FIG. 4 shows a flow diagram for a method for estimating interference levels related to a cellular base station 102 with respect to a neighboring base station 104 in accordance with various embodiments. FIG. 4 shows the operations for estimating interference levels relevant to a single given neighboring base station. The operations of FIG. 4 may be repeated in block 302 for FIG. 3 for each neighboring base station. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer readable medium and executed by a processor.

In block 402, the interference estimator 210 determines the transmit power applied to each radio resource by each wireless device in the cell controlled by the base station 1 102. In some embodiments, the interference estimator 210 retrieves the transmit power values 208 from the control logic 204.

In block 404, the interference estimator 210 estimates the channel strength between each wireless device in the cell controlled by the base station 1 102 and the given neighboring base station. In some embodiments, the interference estimator retrieves the channel strength values 206 from the control logic 204. In some embodiments the interference estimator derives the channel strength values from signal measurement such as RSRP and RSRQ.

In block 406, for each radio resource, the interference estimator 210 computes a sum of products of the transmit power and channel strength for all wireless devices using the radio resource. The result of the summation is a measure of the level of interference the base station 1 102 may induce in the radio resource at the given neighboring base station.

In block 408, the interference estimator 210 compares the sum of products to a predetermined threshold value to generate an interference level estimate value for transfer to the given neighboring base station. In some embodiments, the comparison produces a binary flag wherein one binary state represents "high interference."

Figure 5:
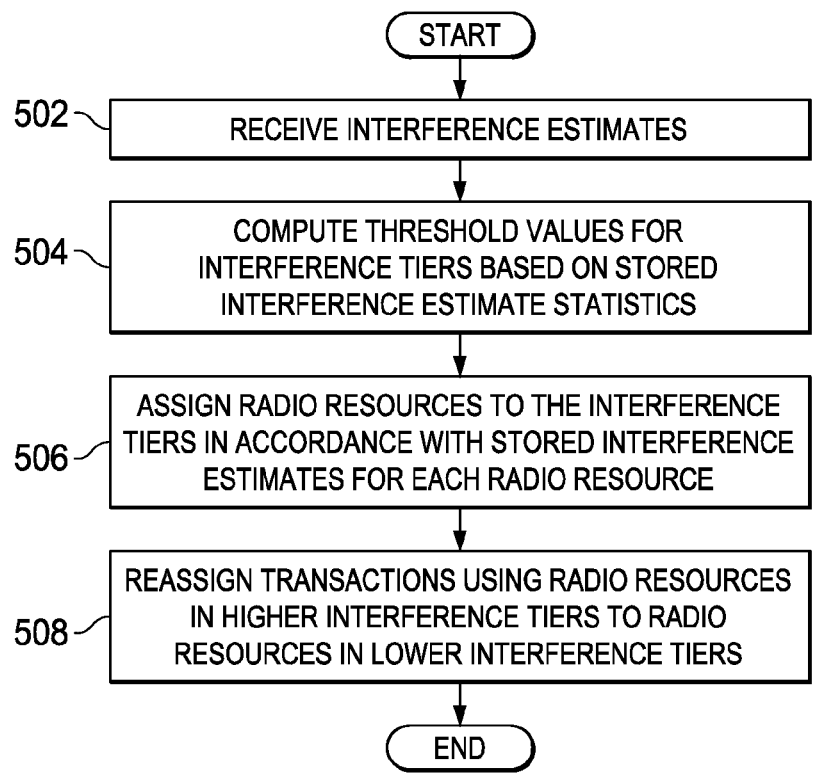
FIG. 5 shows a flow diagram for a method for allocating radio resource in a base station to coordinate interference between neighboring base stations in accordance with various embodiments.

FIG. 5 shows a flow diagram for a method for allocating radio resources in a base station to coordinate interference between neighboring base stations in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 5, as well as other operations described herein, can be implemented as instructions stored in a computer readable medium and executed by a processor.

In block 502, the interference avoider 214 receives interference estimates from one or more neighboring base stations. The interference avoider 214 stores the received interference estimate for each radio resource along with previously received interference estimates for the radio resource, thus generating a history (e.g., a set of the last N received interference estimates) for each radio resource. In some embodiments, the reception of interference estimates is decoupled from the use of the received interference estimates to assign radio resources. Thus, the receiving operation of block 502 may be a separate process, independent of the radio resource assignment operations of blocks 504-508.

In block 504, based on the stored interference estimates for all radio resources, the interference avoider 214 computes threshold values for a plurality of interference tiers. The number of threshold values and interference tiers generated and employed can differ for different embodiments. The thresholds may be based on a total range of interference values across all radio resources where each interference value corresponds to an accumulation of interference estimates received over a time period (e.g., the time period represented by the stored interference estimate history) for each radio resource. For example, an accumulated interference estimate value may correspond to the number of "high interference" estimates received for a radio resource.

The interference avoider 214 evaluates the total range of interference values across all radio resources to identify a lowest interference value and a highest interference value. Based on the identified lowest and highest interference values, the interference avoider 214 generates the plurality of interference tiers. For example, the interference avoider 214 may generate high, medium, and low interference tiers each corresponding to a range of radio resource interference values. Each radio resource is assigned to an interference tier in accordance with the interference value of the radio resource in block 506.

In block 508, the interference avoider 214 assigns and/or reassigns wireless transactions (e.g., transmissions) to the radio resources having the lowest available interference values, where, for example, assigning radio resources is applicable to new calls/transactions, and reassigning radio resources is applicable to ongoing calls/transactions. Thus, transactions assigned to use high interference tier radio resources may be reassigned to use low interference tier radio resources. In some embodiments, transactions are reassigned in order of descending interference level, that is, the transaction assigned to the highest interference level radio resource is reassigned first to the lowest available interference level radio resource, followed by reassignment of the next highest, etc.

Figure 6:
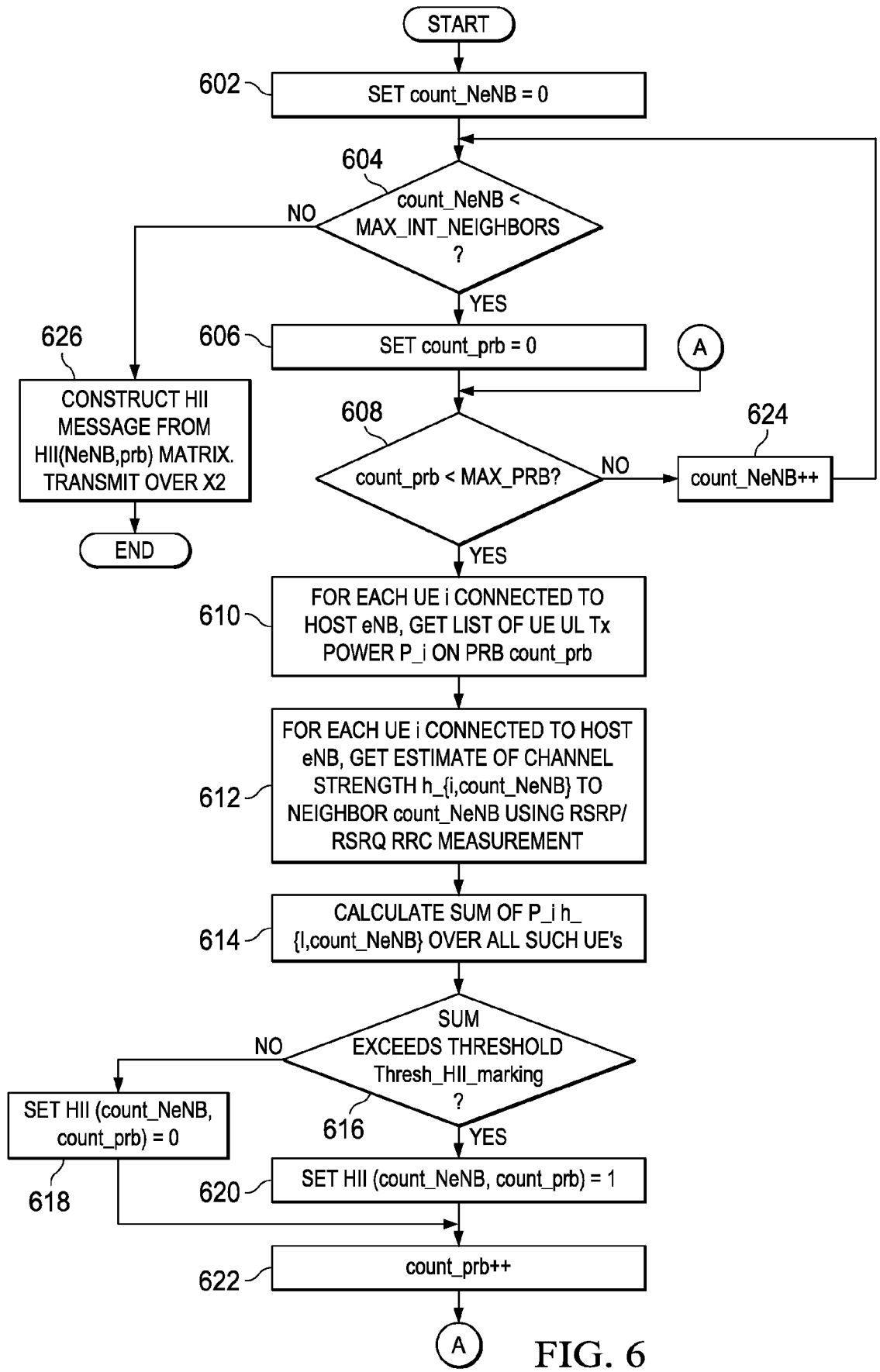
FIG. 6 shows a flow diagram for a method for estimating interference levels related to an evolved NodeB ("eNB") with respect to a neighboring eNB in accordance with various embodiments.

FIG. 6 shows a flow diagram for a method for estimating interference levels related to an eNB with respect to a neighboring eNB in an LTE system in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 6, as well as other operations described herein, can be implemented as instructions stored in a computer readable medium and executed by a processor.

Variables referenced in FIG. 6 are defined as followed. MAX_INT_NEIGHBORS is the total number of neighboring eNBs ("NeNB") within close proximity of a host eNB. In some embodiments, the host eNB transmits HII (i.e., interference estimates) to a nearest set of neighbors, where the nearest set of neighbors effectively correspond to the highest interference neighbors. MAX_PRB is the total number of PRBs over which ICIC is performed. h_{i, count_NeNB} is the channel strength from UE i (which is transmitting to the host eNB on the uplink) to a neighbor eNB (indexed by count_NeNB). The value of Thresh_HII_marking is predetermined and may be set close to the maximum transmit power for the UE class in some embodiments.

In block 602, the count of neighboring eNBs is set to zero to initialize the neighbor eNB processing loop. Whether interference levels for all neighboring eNBs have been estimated is determined in block 604. If not all neighboring eNBs have had interference levels estimated, then in block 606, PRB count is zeroed to initialize the interference level estimation loop for the current neighboring eNB.

Whether all PRBs have been processed for the current neighboring eNB is determined in block 608. If all PRBs for the eNB have not been processed, then in block 610, transmit power of each UE connected to the host eNB for the PRB currently being processed is determined.

In block 612, for each UE connected to the host eNB, channel strength between the UE and each NeNB is estimated. The estimation may use RSRP/RSRQ measurements.

In block 614, an interference level for the current PRB is computed for each eNB. The interference level is estimated as a sum of products of the transmit power and channel strength over all UEs controlled by the host eNB, $$\sum_{i=0}^{i=numUEs-1} P_i h_{i,count\_NeNB}.$$

In block 616, the estimated interference level is compared to the predetermined threshold. A field of an HII array is set if the estimated interference level exceeds the threshold in block 620, and cleared, in block 618, if the estimated interference level does not exceed the threshold.

In block 622, the current PRB is incremented. When all PRBs for an eNB have been processed, as determined in block 608, the current NeNB is incremented in block 624. When all NeNBs have been processed, as determined in block 604, then an HII message is constructed and transmitted to each NeNB in block 626. The message constructed and transmitted to an NeNB may include only HII values relevant to the NeNB.

Figure 7:
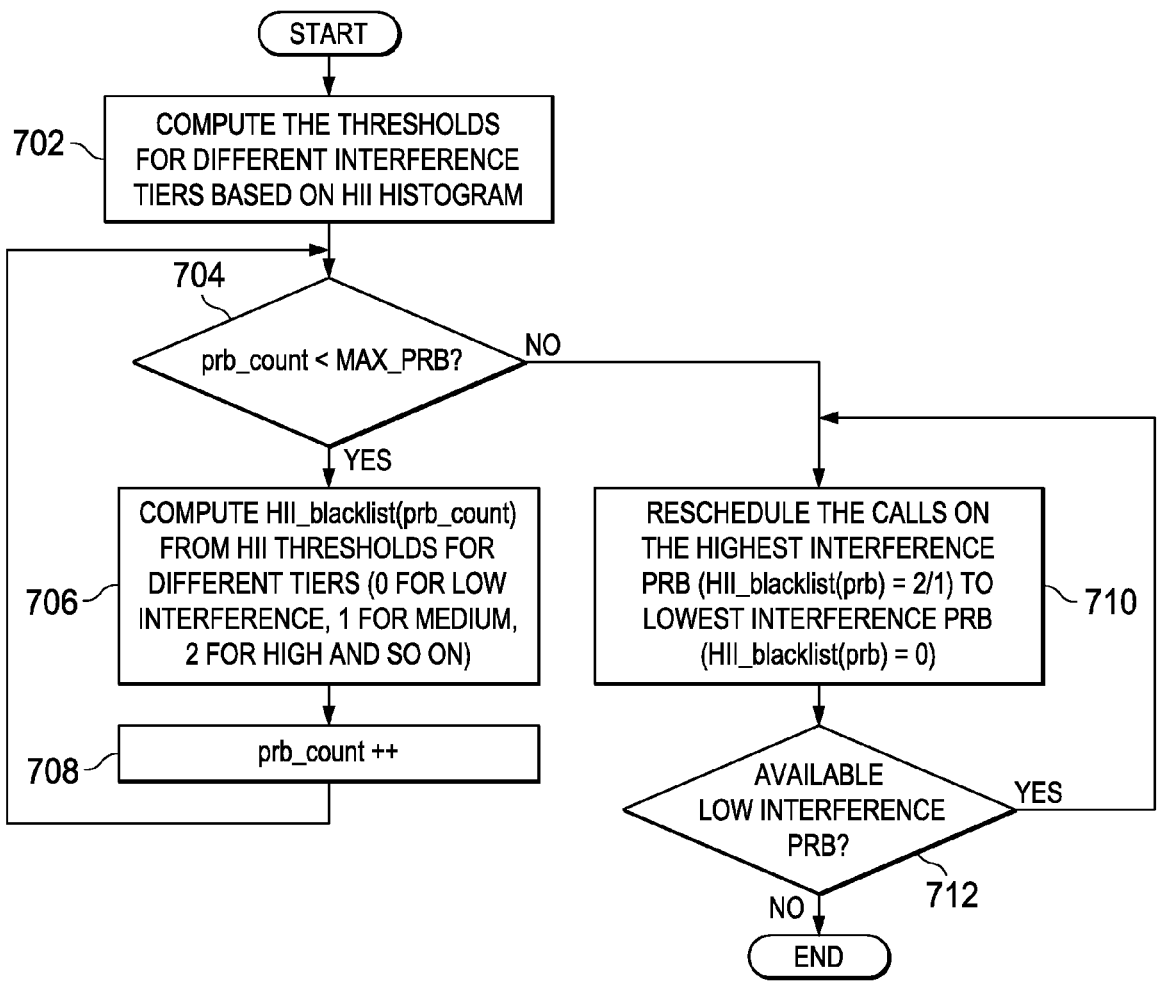
FIG. 7 shows a flow diagram for a method for allocating physical resource blocks ("PRBs") in an eNB in accordance with various embodiments.

FIG. 7 shows a flow diagram for a method for allocating PRBs in an eNB in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 7, as well as other operations described herein, can be implemented as instructions stored in a computer readable medium and executed by a processor.

In block 702, the eNB has received interference estimates (e.g., HII messages) from neighboring eNBs, and has accumulated a history of HII data for each PRB. Based on the interference level history, in block 702, thresholds for different interference tiers are computed. The different HII tier threshold values may be computed based on the minimum and maximum values of the HII history. For example, if the number of tiers is to be three and the minimum history value is 11 (e.g., 11 HII messages indicated a PRB as high interference) and the maximum is 40 (e.g., 40 HII messages indicated a PRB as high interference), the threshold values for the three tiers may be defined as follows:

20—threshold for low interference,
30—threshold for medium interference, and
40—threshold for high interference.

Thus, the low interference tier ranges from 11-20, the medium interference tier ranges from 21-30, and the high interference tier ranges from 31-40.

Whether all PRBs have been assigned to an interference tier is determined in block 704. If not all PRBs have been assigned to an interference tier, then in block 706, the current PRB is assigned to an interference tier. Tier assignment may be denoted by assigning a value representing the tier to the PRB (e.g., 0=low, 1=medium, 2=high). The current PRB is incremented in block 708.

In block 710, transmissions (e.g., calls) on the highest interference PRB are rescheduled onto the lowest interference PRB that is available. High interference tier PRBs are reassigned first. After all transmissions on high interference tier PRBs have been reassigned to low interference PRBs, medium interference tier PRBs will be assigned to any remaining low interference PRBs. Additional low interference PRBs are checked for in block 712, and reassignment of high/medium interference PRBs continues until all low interference PRBs are used or all high/medium interference transmissions are reassigned to low interference PRBs.

Figure 8B:
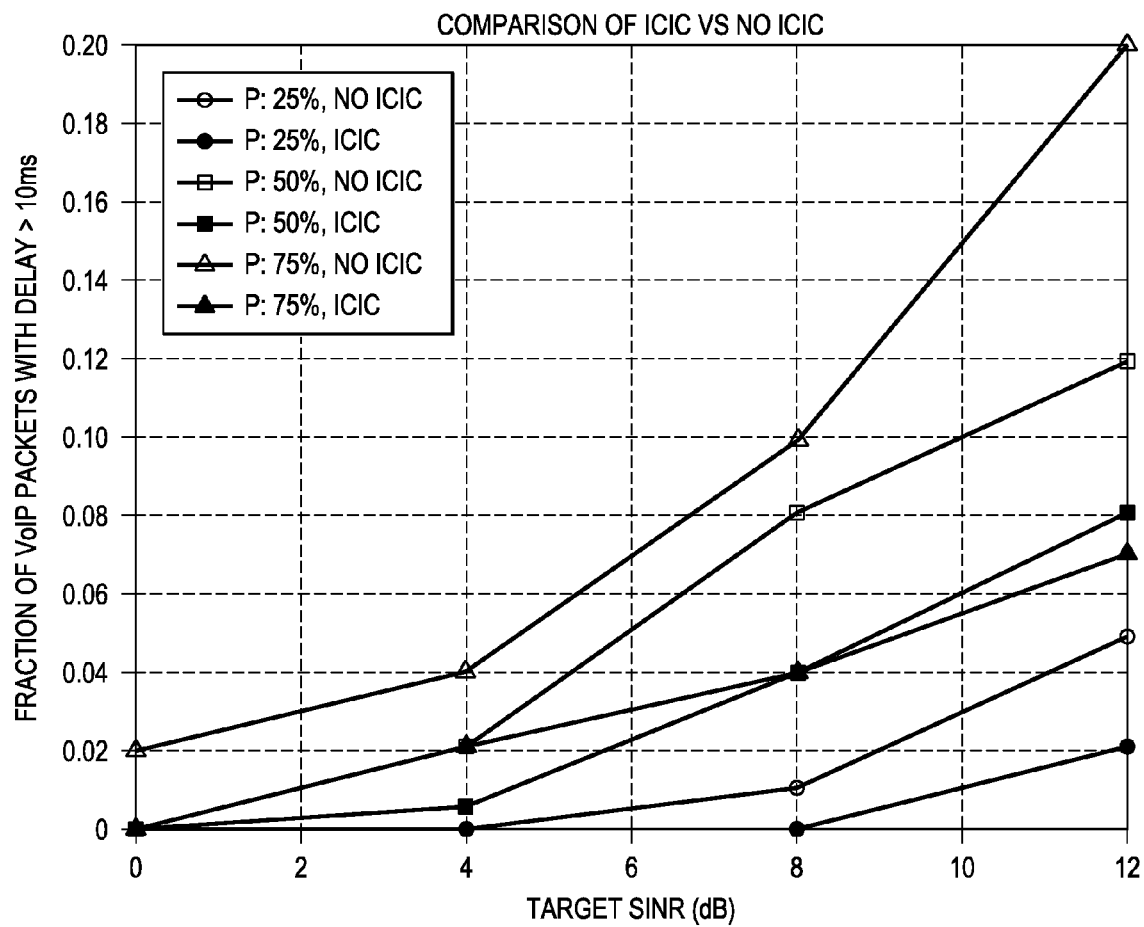

FIGS. 8A and 8B show graphs illustrating performance of a cellular system employing inter-cellular interference coordination in accordance with various embodiments. FIG. 8A-8B illustrate cellular system performance considering penetration levels of 25%, 50% or 75% corresponding to (6, 12 and 18 cells in a 5×5 cell block) being occupied by a HeNB/HUE pair. Each HUE serves SPS traffic with a target SINR of 0, 4, 8 or 12 db. FIG. 8A plots the fraction of UEs that meet the Target SINR level set by the call-admission control unit at the start of SPS scheduling. FIG. 8B presents a "goodput" rate measure in terms of delay. Considering that SPS packets are likely to be time sensitive, FIG. 8B shows the fraction of SPS packets that fail to reach the receiver's medium access control ("MAC") within 10 milliseconds ("ms").

Interference coordination, as provided by embodiments of the present disclosure, greatly improves the fraction of UEs being able to meet the Target SINR. Consequently, with ICIC, packets suffer fewer block errors, and therefore a greater fraction of packets is able to meet the 10 ms deadline. ICIC is important at higher SINR and at higher penetration levels since the number of interferers increases with increasing penetration levels. When employing ICIC as disclosed herein, as many as 15% more packets meet the 10 ms deadline in a high-penetration scenario with high target SINR.

The above discussion is meant to be illustrative of the principles and various embodiments of the present invention. Numerous variations and modifications will become apparent to those skilled in the art once the above disclosure is fully appreciated. For example, while some embodiments are described with reference to uplink interference, those skilled in the art will understand that the techniques described herein may also be applied to coordination of downlink interference. It is intended that the following claims be interpreted to embrace all such variations and modifications.

What is claimed is:

1. A cellular base station interference coordinator, comprising:
    an interference estimator that estimates a level of interference caused by transmissions controlled by a host base station for each of a plurality of radio resources, and provides interference estimates corresponding to the radio resources to a target base station;
    wherein each interference estimate is based on a transmit power and a channel strength to the target base station for each transmission controlled by the host base station for a given radio resource, and
    wherein the interference estimator compares a sum of products of the transmit power and the channel strength to the target base station for each transmission using the given radio resource to a predetermined threshold value to generate an interference estimate value for the given radio resource.

2. The interference coordinator of claim 1, wherein each radio resource comprises a plurality of frequency bands for a predetermined interval.

3. The interference coordinator of claim 1, wherein the interference estimator is configured to generate each interference estimate by combining the transmit power and the channel strength associated with a plurality of wireless devices for the given radio resource.

4. The interference coordinator of claim 1, wherein the interference estimator is disposed within the host base station.

5. A cellular base station interference coordinator, comprising:
    an interference estimator that estimates a level of interference caused by transmissions controlled by a host base station for each of a plurality of radio resources, and provides interference estimates corresponding to the radio resources to a target base station; and
    an interference avoider that assigns radio resources to each transmission controlled by the host base station based on interference estimates received from a neighboring base station,
    wherein each interference estimate is based on a transmit power and a channel strength to the target base station for each transmission controlled by the host base station for a given radio resources, and
    wherein the assignment of radio resources is based on an interference value of each radio resource derived from interference estimates received from one or more neighboring base stations; wherein a radio resource having a lower interference value is given assignment priority over a radio resource having a higher interference value.

6. A cellular base station interference coordinator, comprising:
- an interference estimator that estimates a level of interference caused by transmissions controlled by a host base station for each of a plurality of radio resources, and provides interference estimates corresponding to the radio resources to a target base station; and
- an interference avoider that assigns radio resources to each transmission controlled by the host base station based on interference estimates received from a neighboring base station,
- wherein each interference estimate is based on a transmit power and a channel strength to the target base station for each transmission controlled by the host base station for a given radio resources,
- wherein the interference avoider determines a plurality of interference threshold values for sorting the radio resources, the interference threshold values based on a range of interference estimates received from the neighboring base station, and
- wherein the interference threshold values define a low interference tier, a medium interference tier, and a high interference tier of radio resources.

7. The interference coordinator of claim 6, wherein the interference avoider is configured to reduce inter cell interference by reassigning a transmission using a radio resource in the high interference tier to use a radio resource in the low interference tier.

8. The interference coordinator of claim 6, wherein the interference avoider is configured to allocate, to each transmission, radio resources from a lowest one of the low, medium and high interference tiers including available radio resources.

9. A method for coordinating inter-cell interference, comprising:
- combining, in a first base station, a transmit power and a channel strength to a target base station for each transmission using a radio resource;
- generating an interference estimate for the radio resource based on the combined power and strength; and
- providing the interference estimate to the target base station, wherein the combining comprises summation of products of transmit power and channel strength to the target base station for each transmission, and the generating comprises comparing a result of the summation to a predetermined interference threshold value.

10. The method of claim 9, further comprising:
- receiving an interference estimate for each of a plurality of radio resources from a second base station; and
- assigning radio resources to each transmission controlled by the first base station based on the received interference estimate.

11. The method of claim 10, further comprising determining a plurality of interference threshold values based on a range of interference estimates received from the second base station.

12. The method of claim 11, further comprising:
- defining a plurality of radio resource interference tiers based on the interference threshold values, each tier defining a different level of interference, and
- controlling inter-cell interference by reassigning a transmission using a radio resource in a higher level interference tier to use a radio resource in a lower interference tier.

13. A method for coordinating inter-cell interference, comprising:
- combining, in a first base station, a transmit power and a channel strength to a target base station for each transmission using a radio resource;
- generating an interference estimate for the radio resource based on the combined power and strength; and
- providing the interference estimate to the target base station, wherein the assigning comprises selecting radio resources having a lower number of received high interference estimates for assignment to a transmission prior to radio resources having a higher number of received high interference estimates.

14. A system, comprising:
- a first cellular base station comprising interference estimation logic; and
- a second cellular base station comprising interference avoidance logic, the second cellular base station being coupled to the first cellular base station for communication therewith;
- wherein the interference estimation logic is configured to estimate a level of interference caused by transmissions controlled by the first cellular base station for each of a plurality of radio resources, and to provide interference estimates to the second base station for each radio resource, each interference estimate being based on a combination of transmit power and channel strength to the second cellular base station for each transmission,
- wherein the interference avoidance logic:
    - determines a plurality of interference threshold values for categorizing the radio resources, the interference threshold values based on a range of interference estimates received from the first cellular base station, and
    - defines a radio resource low interference tier, and a radio resource high interference tier based on the interference threshold values.

15. The system of claim 14, wherein the interference estimation logic compares a sum of products of transmit power and channel strength to the second cellular base station for each transmission using a given radio resource to a predetermined threshold value to generate an interference estimate for the given radio resource.

16. The system of claim 14, wherein the interference avoidance logic is configured to assign radio resources to each transmission related to the second cellular base station based on the interference estimates received from the first cellular base station.

17. The system of claim 14, wherein the interference avoider is configured reduce inter cell interference by reassigning a transmission using a radio resource in the high interference tier to use a radio resource in the low interference tier.

18. A cellular base station interference coordinator, comprising:
- an interference avoider that assigns radio resources to each transmission controlled by a host base station based on interference estimates received from a neighboring base station;
- wherein the interference avoider is configured to accumulate interference estimates for each radio resource and to categorize the radio resources based on the accumulated interference estimates, and
- wherein the interference avoider determines a plurality of interference threshold values for categorizing the radio resources, the interference threshold values based on a range of interference estimates received.

19. The cellular base station interference coordinator of claim 18, wherein the interference threshold values define a low interference tier, a medium interference tier, and a high interference tier of radio resources, and the interference avoider is configured reduce inter cell interference by reassigning a transmission using a radio resource not in the low interference tier to use a radio resource in the low interference tier.

20. The cellular base station interference coordinator of claim 18, further comprising:
   an interference estimator that estimates a level of interference caused by transmissions controlled by the host base station for each radio resource, and provides interference estimates corresponding to each radio resource to a target base station;
   wherein each interference estimate is based on transmit power and channel strength to the target base station for each transmission controlled by the host base station for a given radio resource.

21. The cellular base station interference coordinator of claim 20, wherein the interference estimator compares a sum of products of transmit power and channel strength to the target base station for each transmission using the given radio resource to a predetermined threshold value to generate an interference estimate value for the given radio resource.

* * * * *